United States Patent [19]

Nakayama et al.

[11] Patent Number: 5,405,681
[45] Date of Patent: Apr. 11, 1995

[54] DECORATIVE MATERIAL INCLUDING A TRANSFER SHEET HAVING AN ANTISTATIC FUNCTION AND A METHOD FOR PRODUCTION THEREOF

[75] Inventors: Kazuyoshi Nakayama; Akira Hori, both of Tokyo, Japan

[73] Assignee: C.I. Kasei Co., Ltd., Tokyo, Japan

[21] Appl. No.: 989,513

[22] Filed: Dec. 11, 1992

[30] Foreign Application Priority Data

Dec. 12, 1991 [JP]  Japan ................................ 3-350724

[51] Int. Cl.⁶ ................................ B32B 7/02
[52] U.S. Cl. ................................ 428/215; 428/142; 428/144; 428/195; 428/202; 428/203; 428/204; 428/206; 428/403; 428/411.1; 428/323; 156/289; 101/32; 101/170
[58] Field of Search ............. 428/142, 143, 144, 195, 428/204, 206, 208, 323, 403, 407, 914, 202, 203, 404, 411.1, 215; 156/289, 311; 101/32, 170

[56] References Cited

U.S. PATENT DOCUMENTS

| | | | |
|---|---|---|---|
| 4,389,451 | 6/1983 | Fujioka et al. | 428/212 |
| 4,528,222 | 7/1985 | Rzepecki et al. | 428/35 |
| 5,091,229 | 2/1992 | Golike et al. | 428/35.2 |
| 5,182,159 | 1/1993 | Yamauchi et al. | 428/192 |

FOREIGN PATENT DOCUMENTS 0064558  11/1982  European Pat. Off.
0232033  8/1987  European Pat. Off.

OTHER PUBLICATIONS

Derwent Publication WO90-273016 for JP-A-4-185779.
Derwent Publication WO90-085901 for JP-A-2-036942.
Derwent Publication WO86-296218 for JP-A-6-1-219686.
Derwent Publication WO85-021080 for JP-B-6-3-033779.

*Primary Examiner*—Patrick J. Ryan
*Assistant Examiner*—Marie R. Macholl
*Attorney, Agent, or Firm*—Sughrue, Mion, Zinn, Macpeak & Seas

[57] ABSTRACT

A synthetic resin decorative material including an antistatic layer containing an electrically conductive film formed on a surface thereof without changing the color, design and pattern of the decorative material. The synthetic resin may be a synthetic resin decorative sheet/-plate. The antistatic function of the antistatic layer is improved such that occurrence of cracks in the antistatic layer can be prevented when the decorative material having the antistatic layer is thermally molded. To prepare the decorative material, a transfer sheet is pressed while being heated onto a surface of a synthetic resin decorative base material including a synthetic resin sheet or plate. To prepare the transfer sheet, electrically conductive paint containing an electrically conductive matter formed by coating inorganic fine powder having a refractive index of 1.4 to 1.7 with an electrically conductive tin oxide is applied onto a 1 to 5 μm thick transparent or semitransparent synthetic resin coating layer provided on a release sheet. The electrically conductive paint is coated on the synthetic resin coating layer to a thickness of 0.5 to 5 μm when dried.

10 Claims, 2 Drawing Sheets

DECORATIVE MATERIAL INCLUDING A TRANSFER SHEET HAVING AN ANTISTATIC FUNCTION AND A METHOD FOR PRODUCTION THEREOF

BACKGROUND OF THE INVENTION

The present invention relates to a decorative material using a substantially transparent transfer sheet for giving an antistatic function to a surface of the decorative material, and also relates to a method for producing the same.

Heretofore, synthetic resin decorative sheets/plates are widely used as wall materials, ceiling materials, floor materials, furniture materials and so on because they have excellent surface characteristics.

There is however the fact that various troubles are caused by static electricity because this type of synthetic resin decorative sheets/plates have electrical insulating characteristics similar to those of general synthetic resins.

For example, troubles caused by static electricity, such as dusts and sparks which may be sometimes generated, in the processes of sheet/plate producing, secondary molding, coating, and the like, or in the final process in which this type of decorative sheets/plates are used by users, are too numerous to mention.

In recent years, clean rooms have been required strongly with the advance of precision in industry in the fields of electric/electronic techniques, communication appliances, medicines, foods and so on, so that measures of preventing static electricity have turned into a grave issue. To give electrical conductivity to a synthetic resin base, an application type method in which electrically conductive paint prepared by dispersing/dissolving electrically conductive powder and binder resin in an organic solvent to thereby form an electrically conductive film or a transfer type method in which an electrically conductive film is transferred to a base sheet after electrically conductive paint is preliminarily applied to a release film is employed conventionally. An electrically conductive matter is selected according to the purpose. That is, an electrically conductive matter such as a tin oxide, a indium oxide or the like is used as electrically conductive powder for the purpose of forming an electrically conductive film excellent in transparency (application type: Japanese Patent Postexamination Publication No. Sho-63-33779) (transfer type: Japanese Patent Unexamined Publication No. Sho-61-245866). On the other hand, an electrically conductive titanium oxide-coated matter such as a tin oxide (Japanese Patent Postexamination Publication No. Sho-63-33779), a zinc oxide (Japanese Patent Unexamined Publication No. Hei-1-153769), potassium titanate (Japanese Patent Unexamined Publication No. Hei-2-129265) or the like, is used for the purpose of forming a white or light electrically conductive film.

With respect to the former matter, electrically conductive oxides such as a tin oxide, an indium oxide and so on exhibit transparency by the superfine structure of electrically conductive powder. Because the electrically conductive powder per se is however dark gray, color change is remarkable in the case where the former matter is used in the decorative sheet. There arises a problem in that change in color, pattern and the like as a matter of life for the decorative sheet is large.

Furthermore, a film formed of this type fine powder has the property of turning the color to dark by light, though the cause is not clear. This is one reason why the film cannot be used in the decorative material.

On the other hand, with respect to the latter matter, a titanium oxide (the refractive index: 2.7), a zinc oxide (the refractive index: 1.9), a potassium titanate (the refractive index: 2.2) or the like reversely turns its color to white because the refractive index is different from that of the resin. Accordingly, the latter matter cannot be used in the decorative material.

Furthermore, in the aforementioned conventional structure, a problem arises in that fine cracks occur in the electrically conductive film when the synthetic resin plate having the electrically conductive film on its surface is thermally molded. This is because a mixture of electrically conductive powder suppresses the electrically conductive film from expanding sufficiently at the time of thermal molding.

SUMMARY OF THE INVENTION

In such circumstances, a first object of the present invention is to provide a synthetic resin decorative material having an antistatic layer formed as an electrically conductive film on its surface without change in color, design and pattern peculiar to the base material of a synthetic resin decorative sheet or plate.

A second object of the present invention is to provide a synthetic resin decorative material in which: the antistatic function of the antistatic layer is improved more greatly; and occurrence of cracks in the antistatic layer can be prevented when a synthetic resin decorative plate as the decorative material having the antistatic layer is thermally molded.

According to another aspect of the invention, there is provided a method for producing a decorative material using a transfer sheet having an antistatic function, comprising the steps of applying electrically conductive paint having a thickness of 0.5 to 5.0 μm in a dried condition and containing an electrically conductive matter formed by coating inorganic fine powder having the refractive index of 1.4 to 1.7 with an electrically conductive tin oxide onto a 1-5 μm-thick transparent or semitransparent synthetic resin coating layer provided on a released sheet to provide an antistatic layer to thereby prepare a transfer sheet and pressing said transfer sheet in a heating state onto at least a surface of a synthetic resin decorative base material.

In order to attain these and other objects, according to the present invention, there is provided a decorative material using a transfer sheet having an antistatic function, characterized in that a transfer sheet is provided through pressing in a heating condition onto at least a surface of a synthetic resin decorative base material, the transfer sheet having an antistatic layer which is formed by applying electrically conductive paint, to a thickness of 0.5 to 5.0 μm in a dried state, onto a 1-5 μm thick transparent or semitransparent synthetic resin coating layer provided on a release sheet, the electrically conductive paint containing an electrically conductive matter formed by coating inorganic fine powder having the refractive index of 1.4 to 1.7 with an electrically conductive tin oxide.

DESCRIPTION OF THE PREFERRED EMBODIMENTS

The present invention will now be described with reference to the accompanying drawings.

Figure 1:
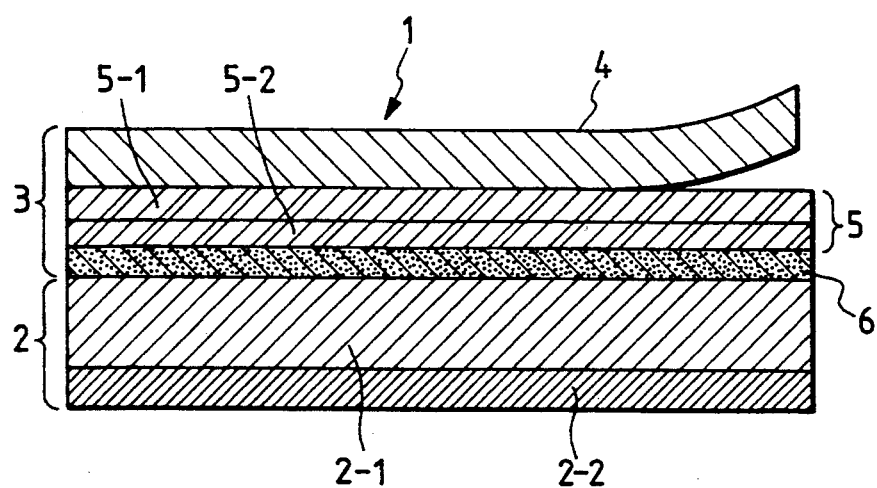
FIG. 1 is a sectional view of a decorative material as an embodiment of the present invention.

In a decorative material 1 using a transfer sheet having an antistatic function according to the present invention and in a method for producing the same, as shown in FIG. 1, the following transfer sheet 3 formed separately is pressed in a heating condition onto a surface of a synthetic resin decorative base material 2 formed of a synthetic resin decorative sheet or plate. Electrically conductive paint containing an electrically conductive matter formed by coating inorganic powder having the refractive index of 1.4 to 1.7 with an electrically conductive tin oxide is applied, to a thickness of 0.5 to 5.0 μm in a dried state, onto a 1–5 μm-thick transparent or semitransparent synthetic resin coating layer 5 provided on a release sheet 4, so that an antistatic layer 6 is provided on the transfer sheet 3.

According to the present invention, an antistatic function can be given to a synthetic resin decorative base material 2 formed of a synthetic resin decorative sheet or plate, without change in color, design and pattern peculiar to the decorative base material.

Furthermore, the synthetic resin coating layer 5 can be thermally expanded while protecting the antistatic layer 6, so that there is no occurrence of cracks in the antistatic layer 6.

An embodiment of the decorative material 1 according to the present invention will be described below.

FIG. 1 is a sectional view showing an embodiment of the decorative material 1 according to the present invention.

In the embodiment in FIG. 1, a single-layered or multilayered decorative sheet 2—2 to which printing, embossing, metal evaporating or the like is preliminarily applied is laminated on an outer surface of a base 2-1 made of a thermoplastic resin such as a transparent or semitransparent rigid vinyl chloride to thereby prepare a synthetic resin base material 2.

A polyethylene film, a polypropylene film, a polyester film or the like is generally used as a release sheet 4 constituting a transfer sheet 3. The polyester film may be selected for the purpose of making thermal lamination possible without expansion or contraction in the process of thermal lamination of the transfer sheet 3 and the synthetic resin base material 2.

Barium sulfate, strontium sulfate, potassium sulfate, mica, clay or the like is used as inorganic fine powder with the refractive index of 1.4 to 1.7 constituting an antistatic layer 6. Barium sulfate may be selected in view of the aptitude for paint. An electrically conductive tin oxide with which the inorganic fine powder is coated is classified into a material doped with an element such as antimony or fluorine and a material not doped with any dissimilar element due to lattice defect of oxygen. A single resin such as an acrylic resin, a vinyl chloride resin or a vinyl acetate resin or a mixture resin thereof may be used as a binder resin used in electrically conductive paint forming the antistatic layer 6, for the purpose of achieving strength in thermal lamination onto a rigid vinyl chloride resin, an acrylic resin or a polycarbonate resin forming the base 2-1 of the synthetic resin decorative material 2. If necessary, an adhesive layer may be further provided.

A general applying structure and a general applying method such as gravure coating or reverse roll coating may be used as the structure and method for applying the electrically conductive paint constituting the antistatic layer 6. Particularly, the following structure and method which will be described with reference to FIGS. 2 and 3 are excellent.

Figure 2:
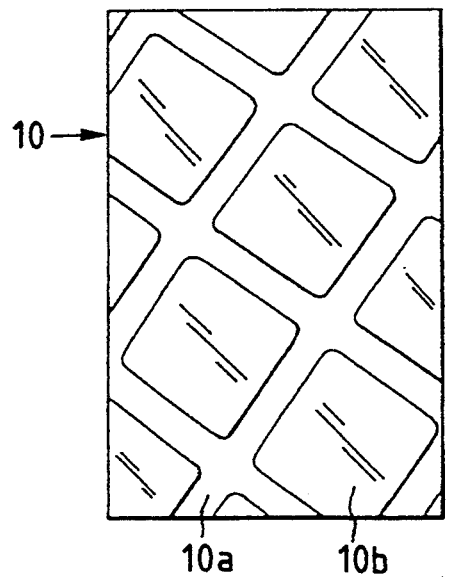
FIG. 2 is an enlarged view (magnified 45 times) of a print plate used in an embodiment of the producing method according to the present invention.

FIG. 2 is an enlarged plan view of a print plate and/or roll (hereinafter called "special gravure print plate") 10 used in application of the electrically conductive paint. The special gravure print plate 10 has fine-groove-shaped gravure cells 10a communicated with one another, and independent banks 10b. The number of lines (gravure cells) is from 10 lines per inch to 100 lines per inch, preferably, from 30 lines per inch to 70 lines per inch. In the case of 50 lines per inch, the width of each gravure cell 10a and the width of each bank 10b are 100 μm and 400 μm, respectively.

Figure 3:
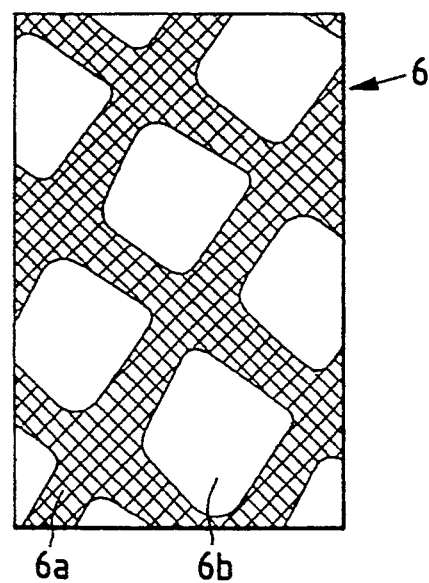
FIG. 3 is a similarly enlarged view of an antistatic layer formed by using the print plate.

FIG. 3 is an enlarged plan view of the electrically conductive paint applying structure formed by using the special gravure print plate 10, that is, the antistatic layer 6. In FIG. 3, the reference numeral 6a designates print portions linearly continued and 6b non-print portions. The width of each print portion 6a and the width of each non-print portion 6b are 150 μm and 350 μm, respectively.

In the antistatic layer 6 in which the electrically conductive paint is printed by the aforementioned method, irregular reflection of light on a surface of the transfer sheet 3 (which will be described later) by highly concentrated inorganic fine particles dispersed in the electrically conductive paint is perfectly prevented by heat pressing or heat roll pressing at the time of thermocompression bonding of the transfer sheet 3 with the synthetic resin decorative base material 2, so that surface change such as tone change and glossiness change can be solved simultaneously in the decorative material.

In the aforementioned structure of the antistatic layer 6 using the special gravure print plate 10, electrically conductive paint is printed into a pattern formed by combining a large number of fine lines. Furthermore, the fine lines are formed by special gravure printing by which paint can be printed in the form of stable lines, compared with general gravure printing by which paint is printed in the form of a set of a large number of points. Accordingly, not only the antistatic effect becomes greater but the tone change in the decorative material becomes smaller. Furthermore, irregular reflection of light on the surface of the sheet by highly concentrated inorganic fine particles dispersed in the electrically conductive paint is perfectly prevented by heat pressing, so that surface change such as change and glossiness change can be solved simultaneously in the decorative sheet.

In the case where the special gravure print plate 10 used has lines not less than 100 lines per inch, the fine line structure as an object of the invention cannot be achieved. On the contrary, in the case where it has lines not more than 10 lines per inch, the antistatic effect is deteriorated.

Although description has been made upon the case where the synthetic resin coating layer 5 has a doublelayered structure in which a hot-melt-type adhesive layer 5-2 adhering to the antistatic layer 6 is provided to an inner surface of a coating layer 5-1 of transparent paint such as acrylic resin or the like, the invention can be applied to the case where it may have a single-layered structure constituted by a coating layer 5-1 so that a hot-melt-type adhesive layer 5-2 is provided to an inner surface of the antistatic layer 6.

The synthetic resin coating layer 5 may be provided as a mat paint type transparent film having delicate roughness transferred to its surface by using a mat paint type released sheet 4. A sheet produced by embossing, machining or the like can be used as the mat paint type released sheet 4. As will be described later, the transfer sheet 3 may be embossed by using an emboss roll at the time of thermal transferring of the transfer sheet 3 to the synthetic resin decorative base material 2 so that the synthetic resin coating layer 5 can be formed into a rough pattern.

An embodiment of the decorative material producing method according to the present invention will be described below.

Figure 4:
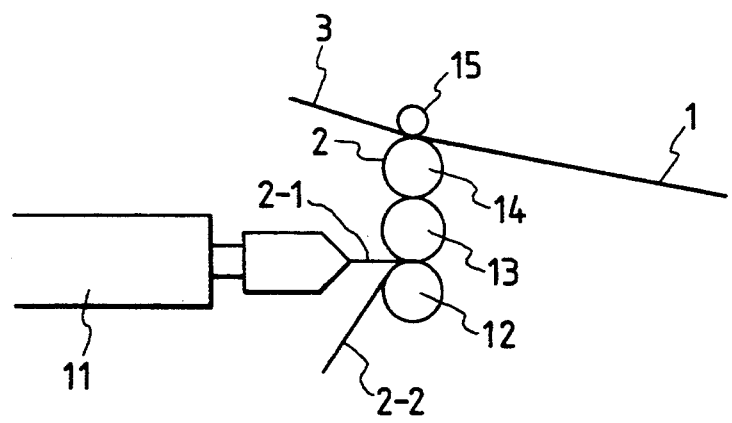
FIG. 4 is a schematic view of a decorative material production method as an embodiment of the present invention, thermally molded.

FIG. 4 shows the steps of an embodiment of the decorative material 1 producing method according to the present invention.

In FIG. 4, reference numeral 11 designates an extruder. When the synthetic resin base 2-1 extruded from a die of the extruder 11 so as to be molded passes between a pair of first rolls 12 and 13, it is joined with the decorative sheet 2-2 being supplied separately and passing to thereby form a decorative base material 2. Before the decorative base material 2 passes between a pair of second rolls 14 and 15, it passes between the one roll 13 of the first rolls and the one roll 14 of the second rolls pressed to each other so that it is supplied between the pair of second rolls 14 and 15 along the outer circumference of the one roll 14 of the second rolls. On the other hand, the transfer sheet 3 produced separately is supplied between the pair of second rolls 14 and 15 with the antistatic layer 6 turned inside. The transfer sheet 3 is pressed onto the decorative base material 2 by heat pressing, so that the decorative material 1 shown in FIG. 1 as an embodiment of the present invention is produced continuously.

At this time, as described above, a rough pattern can be formed on the surface of the synthetic resin coating layer 5 as a transparent or semitransparent top coating layer of the decorative material 1 by using an emboss roll as the other one roll 15 of the pair of second rolls.

When the aforementioned decorative material 1 is applied to various types of decorative sheets or plates having an antistatic function, the released sheet 4 on the surface thereof is released preliminarily.

In the case where the decorative material 1 is produced by heat molding such as vacuum molding or compressed air molding, or in the case where the decorative material 1 has no synthetic resin coating layer 5 as the top coating layer on the top surface thereof, fine cracks may occur in the antistatic layer 6 at the time of heat molding so that not only the antistatic function thereof is spoiled but the external appearance thereof is deteriorated remarkably. On the contrary, according to the present invention, the existence of the synthetic resin coating layer 5 prevents the occurrence of cracks in the antistatic layer 6 at the time of heat molding to thereby make the external appearance good and, at the same time, prevents the spoiling of the antistatic function.

Specific examples of the invention will be described below in comparison with comparative examples.

In each of specific examples, the basic form of the decorative material was as shown in FIG. 1. As the electrically conductive paint used for forming the antistatic layer 6, electrically conductive paint (1) having a solid concentration of 39% (electrically conductive powder concentration of 65% thereof) was prepared by dispersing 100 parts of electrically conductive barium sulfate (tradename: Pastran Type IV, Mitsui Mining & Smelting Co., Ltd.) per 30 parts of acrylic transparent resin (tradename: Honnylon 1301, Honey Chemical Co., Ltd.) having a solid concentration of 18% for 48 hours in a ball mill.

In each of the following examples, the electrically conductive paint (1) was further diluted with MEK to prepare electrically conductive paint (2) having a Ford cup viscosity of 14 sec. The electrically conductive paint (2) was used in each of the embodiments. In comparative examples, the electrically conductive barium sulfate was successively replaced by an electrically conductive tin oxide fine powder (tradename: T-1, Mitsubushi Material Co., Ltd.) and a titanium oxide fine powder (tradename: W-1, Mitsubishi Material Co., Ltd.) coated with an conductive tin oxide.

EXAMPLE-1

The aforementioned electrically conductive paint with a thickness of 2 μm was applied to a 2 μm-thick acrylic coating of a 12 μm-thick polyester film to thereby prepare an antistatic transfer film.

The antistatic transfer film thus prepared was extruded and laminated onto a 2 mm-thick white rigid vinyl chloride plate to thereby prepare a white rigid vinyl chloride plate having an antistatic function.

EXAMPLE-2

This example was similar to Example-1 except that the white rigid vinyl chloride plate was replaced by a rigid vinyl chloride having a grain of wood decorative pattern.

EXAMPLE-3

This embodiment was similar to Example-1 except that a gravure printing method using a print plate having fine-groove- shaped gravure cells communicated with one another, and independent banks and having 50 lines (cells) per inch and a plate depth of 20 μm was used as the electrically conductive paint applying method.

COMPARATIVE EXAMPLE-1

This comparative example was similar to Example-1 except that so-called transparent electrically conductive paint having electrically conductive tin oxide fine powder as a main component was used as the electrically conductive paint.

COMPARATIVE EXAMPLE-2

This comparative example was similar to Example-1 except that white electrically conductive paint having a titanium oxide coated with an electrically conductive tin oxide as a main component was used as the electrically conductive paint.

The following Table 1 is a table for comparison in operation between the examples and the comparative examples.

TABLE 1

|  | Example 1 | Example 2 | Example 3 | Comparative example 1 | Comparative Example 2 |
| --- | --- | --- | --- | --- | --- |
| External Appearance | Good | Very Good | Very Good | Discolored to dark | Discolored to gray |
| Color Difference | 1.54 | — | 1.02 | 7.40 | — |
| Surface Resistivity ($\Omega$) | $3.2 \times 10^9$ | $3.4 \times 10^9$ | $7.1 \times 10^9$ | $2.5 \times 10^8$ | $3.8 \times 10^9$ |

External appearance was estimated by naked eyes.

Color difference was estimated by SM color computer (Suga tester).

As described above, according to the present invention, an antistatic function can be provided without tone change, so that antistatic decorative sheets/plates such as white sheets/plates, black sheets/plates, color sheets/plates, patterned sheets/plates and so on can be produced easily.

Furthermore, the synthetic resin coating layer 5 can be thermally expanded while protecting the antistatic layer 6 when a decorative plate as the decorative material according to the present invention is thermally molded, so that not only a good antistatic function can be provided continuously without occurrence of cracks in the antistatic layer 6 but good external appearance can be provided.

Furthermore, when the antistatic layer 6 is formed by using the special gravure print plate 10, not only the antistatic effect of the present invention can keep good but the tone change can become smaller.

What is claimed is:

1. A decorative material, comprising a transfer sheet and a synthetic resin decorative base material provided on said transfer sheet, said transfer sheet comprising: an antistatic layer comprising an electrically conductive paint layer having a thickness of 0.5 to 5 μm in a dried state; a transparent or semitransparent synthetic resin coating layer having a thickness of 1 to 5 μm, the antistatic layer being provided on said synthetic resin coating layer and between said synthetic resin coating layer and said synthetic resin decorative base material; and a release sheet releasably attached to said synthetic resin coating layer on a side thereof opposite said antistatic layer; said electrically conductive paint comprising a binder and an electrically conductive matter comprising inorganic powder having a refractive index of 1.4 to 1.7, said powder being coated with an electrically conductive tin oxide.

2. The decorative material according to claim 1, wherein said inorganic powder is barium sulfate.

3. The decorative material according to claim 1, wherein said binder of said electrically conductive paint is selected from the group consisting of a methylmethacrylate resin, a vinyl chloride-vinyl acetate copolymer and a mixture thereof.

4. The decorative material according to claim 1, wherein said antistatic layer comprises lines of said electrically conductive paint, said lines being present in an amount of 10 lines per inch to 100 lines per inch, and wherein said lines are arranged crossing one another.

5. The decorative material according to claim 4, wherein said lines of electrically conductive paint are present in an amount of 30 lines per inch to 70 lines per inch.

6. The decorative material according to claim 1, wherein said release sheet is a polyester film.

7. A method for producing a decorative material, comprising the steps of:

preparing a transfer sheet by applying electrically conductive paint onto a 1 to 5 μm thick transparent or semitransparent synthetic resin coating layer provided on a release sheet to provide an antistatic layer having a thickness of 0.5 to 5 μm in a dried condition on said synthetic resin coating layer, said electrically conductive paint comprising an electrically conductive matter comprising inorganic powder having a refractive index of 1.4 to 1.7, said powder being coated with an electrically conductive tin oxide; and pressing said transfer sheet onto a surface of a synthetic resin decorative base material while heating said transfer sheet and said base material, said antistatic layer being provided between said synthetic resin coating layer and said synthetic resin decorative base material.

8. The method according to claim 7, further comprising the step of forming a pattern on said synthetic resin coating layer by pressing an emboss roll or an emboss plate onto said synthetic resin coating layer during said step of pressing said transfer sheet onto said synthetic resin decorative base material.

9. The method according to claim 7, wherein said step of applying said electrically conductive paint onto said synthetic resin coating layer comprises gravure printing of said electrically conductive paint on said synthetic resin coating layer using a gravure printing plate comprising fine-groove-shaped cells and independent banks, said gravure printing forming lines of said electrically conductive paint arranged in an amount of 10 lines per inch to 100 lines per inch.

10. The method according to claim 9, wherein said lines of said electrically conductive paint are arranged in an amount of 30 lines per inch to 70 lines per inch.

* * * * *